US007912036B2

(12) United States Patent
Moore

(10) Patent No.: US 7,912,036 B2
(45) Date of Patent: Mar. 22, 2011

(54) PROVISION OF TELEPHONY CALLER ID SERVICE VIA COMMON INSTANT COMMUNICATIONS CLIENTS

(75) Inventor: Richard Garrett Moore, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2130 days.

(21) Appl. No.: 10/794,427

(22) Filed: Mar. 5, 2004

(65) Prior Publication Data

US 2005/0180553 A1  Aug. 18, 2005

Related U.S. Application Data

(60) Provisional application No. 60/544,115, filed on Feb. 12, 2004.

(51) Int. Cl.
*H04L 12/66* (2006.01)

(52) U.S. Cl. .......................................... 370/352; 370/389

(58) Field of Classification Search ............... 379/88.18, 379/142.01–14, 88.19, 88.2, 88.21; 370/352–356, 370/389, 392–393
See application file for complete search history.

(56) References Cited

U.S. PATENT DOCUMENTS

| 5,805,587 | A | * | 9/1998 | Norris et al. | 370/352 |
| 6,775,362 | B1 | * | 8/2004 | Ransom | 370/352 |
| 7,039,165 | B1 | * | 5/2006 | Saylor et al. | 379/88.18 |
| 2003/0219109 | A1 | | 11/2003 | Malik | |

FOREIGN PATENT DOCUMENTS

| EP | 0978983 | 2/2000 |
| WO | 02/093889 | 11/2002 |
| WO | 03/063519 | 7/2003 |

* cited by examiner

*Primary Examiner* — Suhan Ni

(57) ABSTRACT

An approach is provided for supporting telephony services over a data network. A communication network establishes a voice session from a calling station to a called station associated with a user. A service platform, in communication with the communication network, obtains Caller ID information corresponding to the voice session, and determines an instant communication client of the user. The Caller ID information is transmitted over the data network to the instant communication client for display of the Caller ID information.

13 Claims, 7 Drawing Sheets

PROVISION OF TELEPHONY CALLER ID SERVICE VIA COMMON INSTANT COMMUNICATIONS CLIENTS

RELATED APPLICATIONS

This application is related to, and claims the benefit of the earlier filing date under 35 U.S.C. §119(e) of, U.S. Provisional Patent Application filed Feb. 12, 2004 (Ser. No. 60/544, 115), entitled "Provision of Traditional Telephone Services into Non-telephone Devices Using Instant Communications Technology"; the entirety of which is incorporated herein by reference.

FIELD OF THE INVENTION

The present invention relates to communications, and more particularly, to providing telephony services over instant communications clients.

BACKGROUND OF THE INVENTION

When developing new services, service providers are ever mindful of cost. In general, the introduction of new communication services requires a large investment in new infrastructure, not to mention development costs. Given the competitive landscape of communication services, service providers need to be more innovative in seeking new sources of revenue. It is observed that despite the popularity of the Internet and its many applications (even with Voice Over Internet Protocol (VoIP)), the development of data communications has remained largely independent from voice communications and telephony services. In other words, the advancement in services on the telephony side has not been well integrated on the data network side.

For example, Caller Number Identification Service, commonly known as Caller ID (or CID), is a commonly used telephony feature, supported by wireline and wireless public switched telephone networks (PSTN). Typically, Caller ID information is delivered by the telephone network to telephone handsets or to hardware devices specifically designed to record and display this information. Apart from these conventional methods, this information is not made readily available to end users.

Therefore, there is a need for supporting telephony services, such as Caller ID, over a data network. There is also a need to deploy a communications service that utilizes existing infrastructure. There is a further need to support a new source of revenue for service providers to bill for the telephony services.

SUMMARY OF THE INVENTION

These and other needs are addressed by the present invention, in which an approach is presented for providing a Caller Identification (ID) service to an instant communication (IC or instant messaging (IM)) client. A Caller ID Service Platform communicates with a circuit-switched telephone system as well as a packet-switched telephony system to obtain Caller ID information (e.g., calling number and/or called number) corresponding to a voice session that is terminated at one or more called stations associated with the user. The platform utilizes a user database that stores a user profile which specifies the called numbers that are to be monitored for this service in addition to one or more instant communication clients that are to receive the Caller ID for display. The platform supports the display of multiple called numbers via a single IC client, thereby creating a convenience feature for a user who may have multiple telephones (e.g. home1, home2, cell1, cell2, office1, remote phone1) but desires to receive Caller ID services via one common interface. For example a user may want to view caller identification information on his or her home phone or a phone associated with a family member while at work. The above arrangement advantageously provides an integrated approach to telephony services using existing communication infrastructure. This approach also provides service providers with a new, viable source of revenue.

According to one aspect of the present invention, a method for supporting telephony services over a data network is disclosed. The method includes determining that a voice session from a calling station is destined to called station associated with a user; obtaining an identifier associated with the calling station. The method also includes determining an instant communication client of the user. Further, the method includes forwarding the identifier over the data network to the instant communication client, wherein the voice session is terminated at the called station and the instant communication client displays the identifier.

According to another aspect of the present invention, a computer-readable medium carrying one or more sequences of one or more instructions for supporting telephony services over a data network is disclosed. The one or more sequences of one or more instructions including instructions which, when executed by one or more processors, cause the one or more processors to perform the steps of determining that a voice session from a calling station is destined to called station associated with a user; obtaining an identifier associated with the calling station; determining an instant communication client of the user; and forwarding the identifier over the data network to the instant communication client. The voice session is terminated at the called station, and the instant communication client displays the identifier to the user.

According to another aspect of the present invention, a system for supporting a Caller Identification (Caller ID) service over a data network is disclosed. The system includes a communication network configured to establish a voice session from a calling station to a called station associated with a user. The system also includes a service platform in communication with the communication network. The service platform is configured to obtain Caller ID information corresponding to the voice session, and to determine an instant communication client of the user. The Caller ID information is transmitted over the data network to the instant communication client for display of the Caller ID information.

According to another aspect of the present invention, a system for supporting a Caller Identification (Caller ID) service over a data network is disclosed. The system includes means for obtaining Caller ID information corresponding to a voice session from a calling station to a called station associated with a user; means for determining an instant communication client of the user; and means for transmitting the Caller ID information over the data network to the instant communication client for display of the Caller ID information.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for supporting telephony services, such as Caller Identification (CID), over a data network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
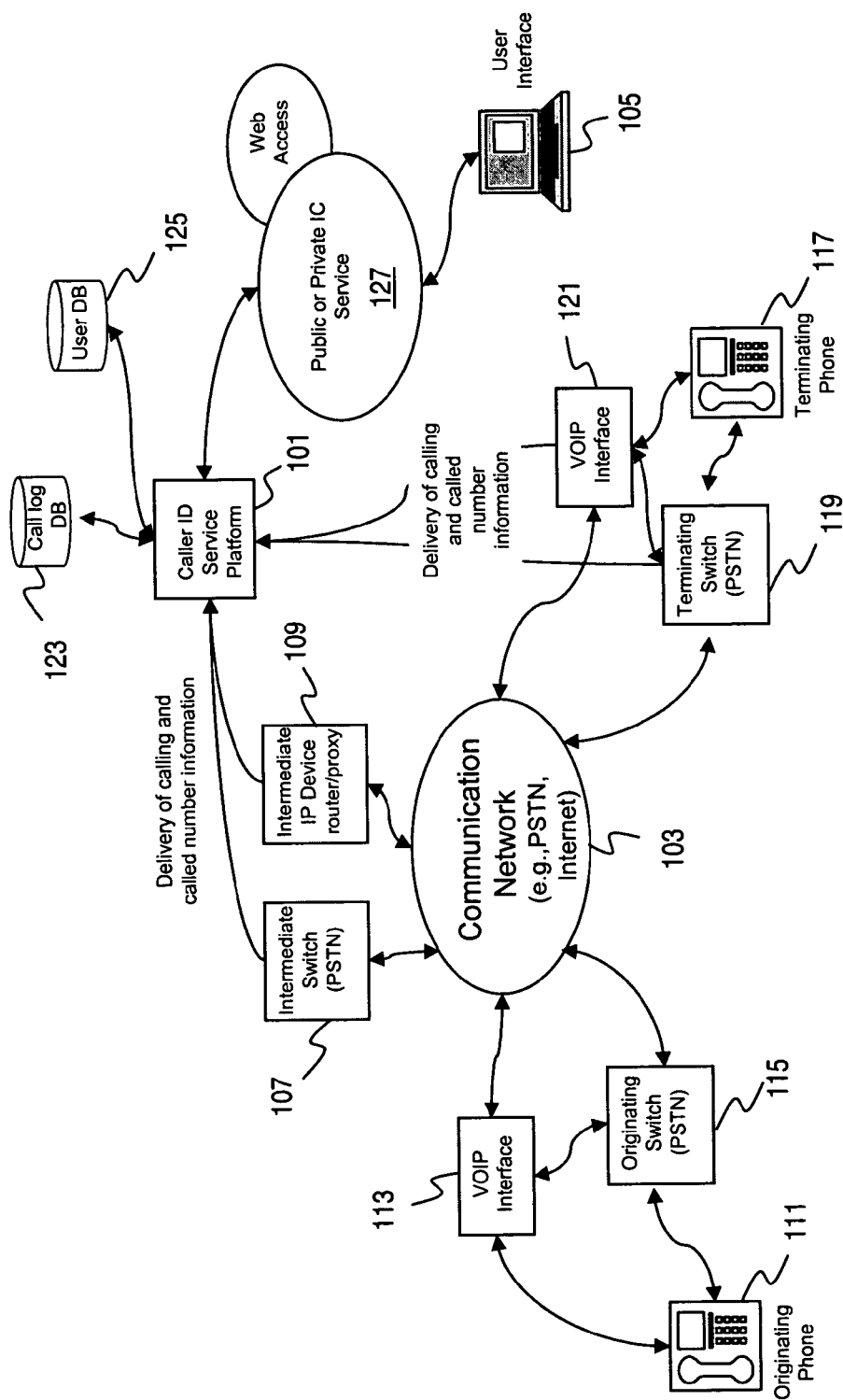
FIG. 1 is a diagram of a communication system that is capable of providing telephony services to instant communication (IC) clients, according to an embodiment of the present invention.

FIG. 1 shows a diagram of a communication system that is capable of providing telephony services to instant communication clients, according to an embodiment of the present invention. As shown, a Caller ID Service Platform 101 interfaces with a communication network 103 to obtain Caller ID information (CID) (e.g., calling number and called number) for dissemination to an instant communication (IC) (or instant messaging (IM)) client resident, in this example, on a host 105. It is recognized that IC clients are pervasive and can run on multiple types of devices, such as a personal computer, which offers a greater degree of options and services associated. An example of such services includes cataloging, storage, sorting, and retrieval of call activity or integration with other common applications such as email.

The Caller ID information pertains to a voice session established over the communication network 103, which can be a circuit-switched telephony system (e.g., a private telephony network or a Public Switched Telephone Network (PSTN)) or a data network providing Voice over IP (Internet) communication. Irrespective of whether the voice session is a Plain Old Telephone Service (POTS) call or a VoIP call, telephone directory information about a calling station constitutes Caller ID information. Such information can be supplied by a switch 107 or a router or proxy device 109 to the platform 101.

By way of example, a caller originates a voice session using a calling station 111 using either a VoIP interface 113 or an originating PSTN switch 115. The caller dials the called number or other common identifier of a station 117, which in this scenario is the called station. The voice session is established over the network 103 and terminates at a terminating PSTN switch 119 or a VoIP interface 121 (if the voice session is a VoIP call). During this call establishment, the Caller ID Service Platform 101 obtains the Caller ID information for relay to one or more IC/IM clients (e.g., host 105); this operation is detailed below in FIG. 2. The platform 101 can support this function while acting, for example, as an adjunct processor, intelligent peripheral, or similar device that directly processes the call either through in-band signaling or common telephony interface signaling such as Integrated Services Digital Network (ISDN), or via separate call control signaling information passed via an interface specifically designed to handle call control signaling information using protocols such as, but not limited to, Session Initiation Protocol (SIP) or Signaling System 7 (SS7).

Figure 2:
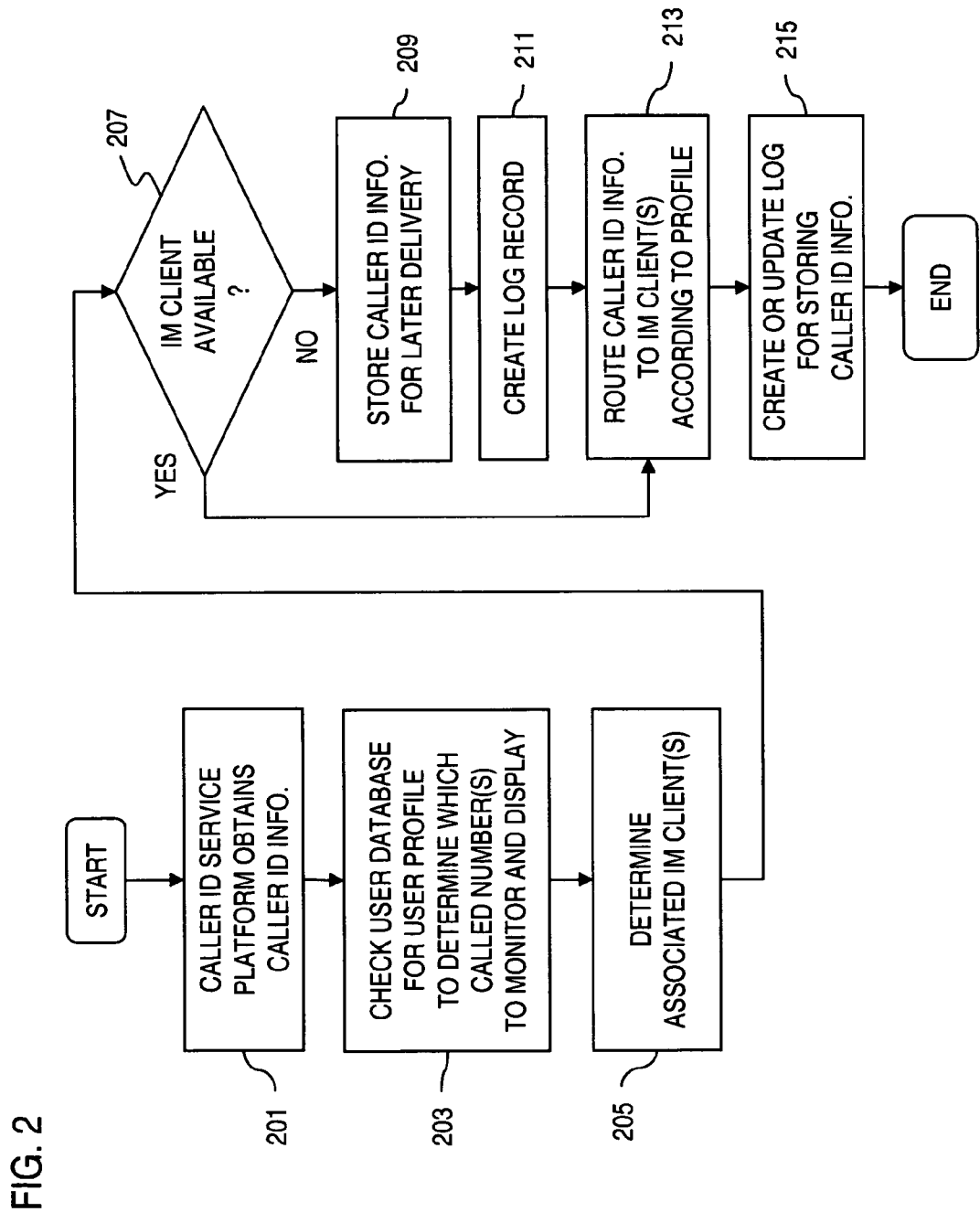
FIG. 2 is a flowchart of a process for providing Caller Identification (ID) service to an instant communication client, according to an embodiment of the present invention.

FIG. 2 shows a flowchart of a process for providing Caller Identification (ID) service to an instant communication client, according to an embodiment of the present invention. In step 201, the Caller ID Service Platform 101 obtains the Caller ID information (e.g., calling number), along with the called number corresponding to the called station 117, from the intermediate nodes 107, 109. If this information is collected from the voice switch 107, the information can be extracted from, for example, Automatic Number Identification (ANI) information. Next, the platform 101 accesses a User Database 125 to examine a profile associated with a user (or subscriber) corresponding to the called number, as in step 203. For the called number if this information is collected from the voice switch 107, the Caller ID information can be extracted from, for example, Dialed Number Identification (DNIS) information. The user profile contains information regarding the called numbers that are to be monitored; these called numbers can correspond to a work number, a home number, a cellular phone number, etc. of the user. Additionally, the profile specifies one or more instant communication clients (or IM clients) that are to receive the Caller ID information. In step 205, the associated IM client is determined based on this profile.

The platform 101 then determines whether the specified IM client is available (i.e., present, or activated), per step 207. If the IM client is not available, the Caller ID information, as in step 209, can be stored for later delivery. In step 211, the platform 101 creates a log of the Caller ID information in a Call Log Database 123. Thereafter, the Caller ID Service Platform 101 appropriately forwards the Caller ID information to the IC/IM clients over a data network 127 according to the profile, per step 213. The data network 127 can supply a public IC service or a private IC service (e.g., an enterprise scenario). Examples of IC or IM clients include products such as AMERICA ON-LINE™ Instant Messenger, and MICROSOFT® Windows Messenger. In step 215, the Call log is created or updated to store the Caller ID information.

The platform 101 advantageously provides convenience for the user by delivering the Caller ID information to other communication devices (which are supported by a variety of technologies). Provision of Caller ID in the manner described above can be performed in conjunction with conventional Caller ID Service or can supplant these conventional methods (which can reduce the cost of telephone stations). The Caller ID service, according to the present invention, can be extended to a variety of devices, such as hand-held devices, gaming consoles, television sets, and other appliances which either are, or can be made capable of instantiations of instant communications clients (or like software interfaces). Also, the approach, consistent with an embodiment of the present invention, does not require the Caller ID delivery point to be wired to the device or the network upon which the call is being delivered. For example, a call can terminate at a home on a traditional phone, and the associated Caller ID information can be displayed on a computer connected to the Internet 103.

Figure 3:
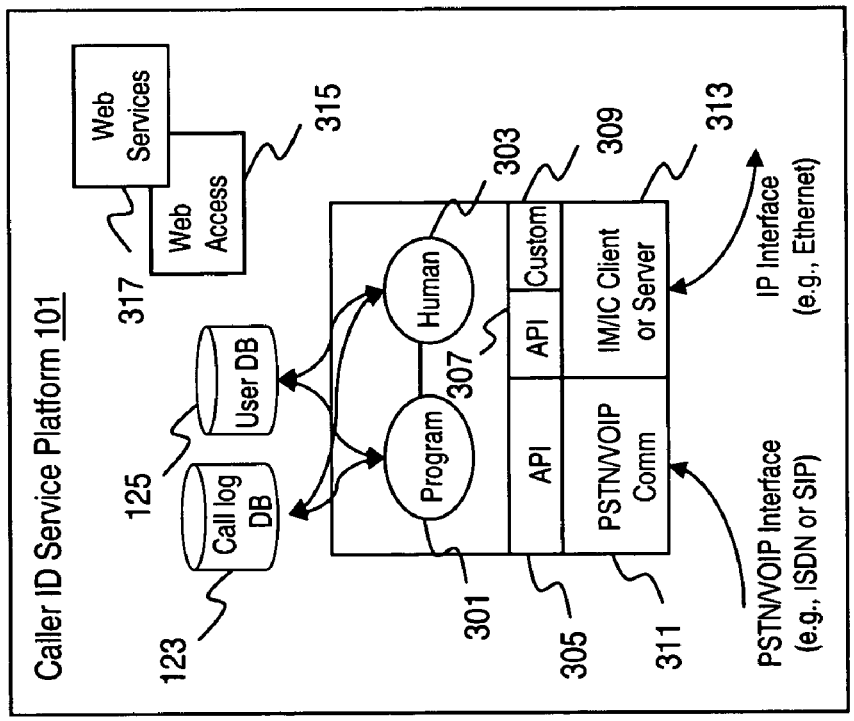
FIG. 3 is a diagram of a Caller ID Service Platform used in the system of FIG. 1.

FIG. 3 shows a diagram of a Caller ID Service Platform used in the system of FIG. 1. As seen in FIG. 3, the Caller ID Service Platform 101 can involve a both program 301 that accesses information from the databases 123, 125 as well as a human component 303 for interacting with the program 301. The platform 101 also provides the necessary APIs 305, 307, and any custom interfaces 309 (depending on the system to be interfaced) required to communicate with a PSTN/VoIP communication system 311 and an IM/IC server (or client) 313. The PSTN/VoIP communication system 311 communicates with the intermediate nodes 107, 109, while the IM/IC host 313 communicates with the data network 127, which supplies an IC environment. According to one embodiment of the present invention, the server 313 can be used as a "presence server," as described below.

In accordance with various embodiments of the present invention, the IM/IC client 313 can be determined to be active based on a presence identifier. A presence identifier is an alphanumeric handle of a user or party that can be used to query the server 313 (referred to as a "presence server") for determining a communications state of the user. The communications state indicates at least whether or not the party is available to accept delivery of preferably real-time communications. Examples of real-time communications include instant messages, chat messages, voice-enabled chat, Internet Relay Chat (IRC), voice over Internet Protocol (IP), and any other messages delivered at a rate capable of supporting an interactive session. In contrast to the store-and-forward approach of electronic mail, the delivery of communications indicated in the communications state is typically immediate, in which a message in the communication is dropped if there is an obstacle to delivery. Accordingly, a presence identifier can include any of a screen name, a handle, an electronic pseudonym, a chat identifier, and an instant message identifier.

The presence server 313 can be implemented as a computer system that furnishes the presence services described in Internet Engineering Task Force (IETF) Reference for Comment (RFC) 2778, which is incorporated herein by reference in its entirety, or similar specifications and may include those popular presence servers supplied by AMERICA ON-LINE™, YAHOO™, etc. Typically, users who wish to make their on-line presence known register their communication state with the presence server 313. Specifically, when a user logs in somewhere on the Internet, corporate intranets, or other similar networks, the user registers with the presence server 313 that the user is available, and when the user logs out, the user registers with the presence server 313 that the user is unavailable.

As mentioned above, the system 101 can utilize the Call Log database 123 (or a similar database) to store for later or delayed delivery of CID information that the system 101 is unable to deliver to a non-present or unavailable user. This capability permits maintenance of historical records, which is important in monitoring functions. The Call Log database 123, thus, permits the ability to mark a CID record as "delivered" (or other states). Furthermore, the database 123 can support appending information, such as timestamps or other information.

Furthermore, the platform 101 provides web-based applications in support of the Caller ID service. In particular, web access components 315 and web services components 317 permit, for example, a remote user to modify the contents of the User Database 125 or to view and manipulate the Call Log database 123. This function is more fully described with respect to FIG. 6.

Figure 4:
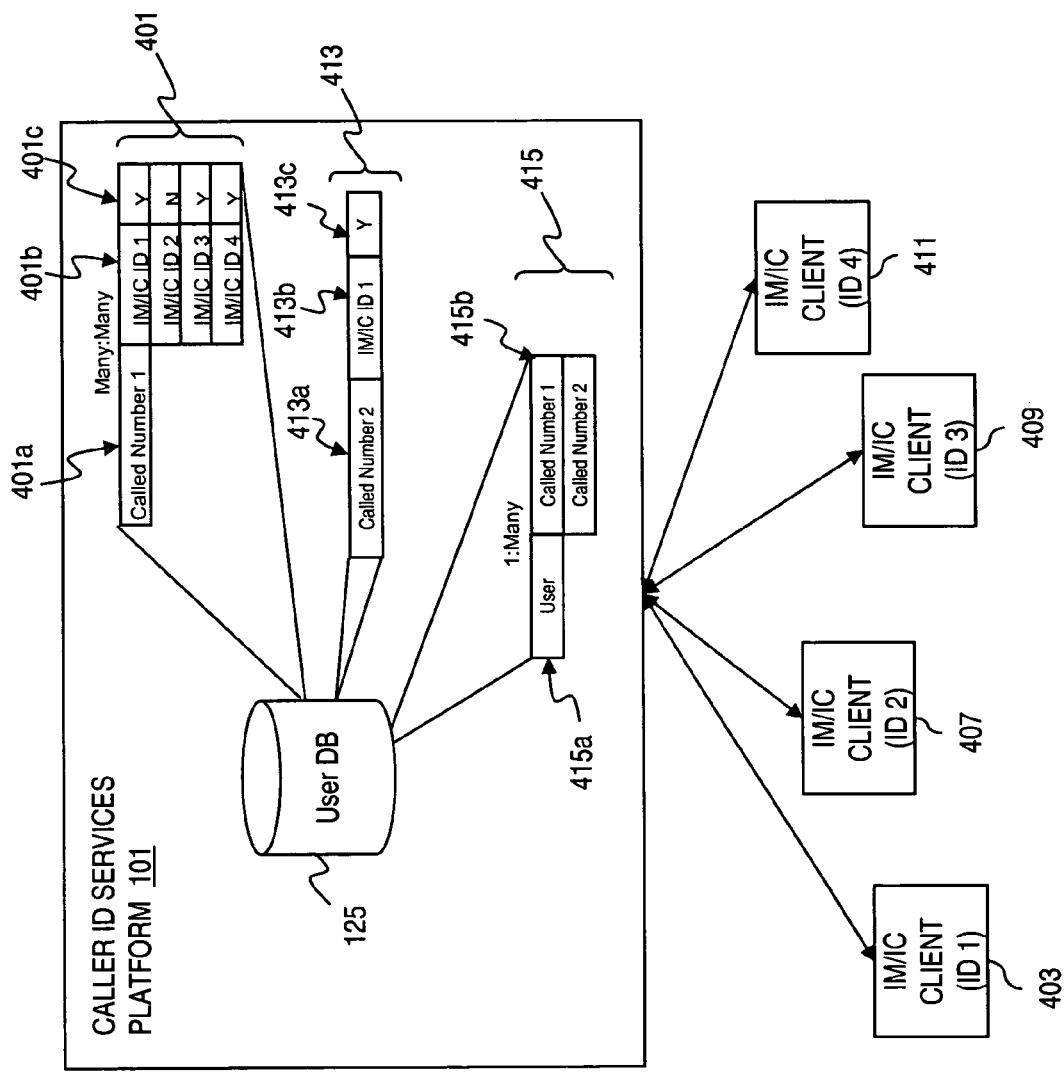
FIG. 4 is a diagram of a user database utilized in the Caller ID Service Platform of FIG. 1.

FIG. 4 shows a diagram of a user database utilized in the Caller ID Service Platform of FIG. 1. As mentioned earlier, the Caller ID Service Platform 101 permits multiple IM/IC clients to be associated with one or more called numbers. That is, the platform 101 supports a many-to-many relationship between the called numbers and the IM/IC clients. In this example, the User Database 125 maintains a profile table 401 with a column 401*a* for the Called Numbers, a column 401*b* for the IM/IC Client Identifiers, and a column 401*c* to designate whether the particular IM/IC client should receive the Caller ID information. With this profile, when Caller ID information is obtained corresponding to a call destined for the Called Number in column 401*a*, the Caller ID information would be forwarded to the IM clients 403, 407, and 409 corresponding to clients 1, 3, and 4 respectively within the column 401*b*. However, the IM/IC client 405 would not receive the Caller ID information. It is noted that the IM/IC client 405 may in the future be designated to receive the Caller ID information, upon appropriate modification of the user profile. Furthermore, the profile within the User Database 125 can also be based on a schedule, whereby the activation of a particular Called Number or IM/IC client can be schedule driven.

Additionally, a different Called Number 2 can be associated with an IM/IC client that is also associated with Called Number 1. A table entry 413 thus includes columns 413*a*-413*c* to store the following information: called number, IM/IC client, and whether the IM/IC client should receive the Caller ID information.

As further seen in FIG. 4, an association between a user and one or more called numbers is supported, as in table entry 415. This association can be a one to many relationship; a user column 415*a* and a Called Number column 415*b*. It is noted that the platform can support a scenario whereby these same numbers are associated with other users. In such case, a security mechanism may be required to ensure that only the users who should legitimately be able to monitor any given numbers is allowed to do so; for example, the owner of the number (i.e., the person or entity who pays for the service associated with that called number).

Figure 5:
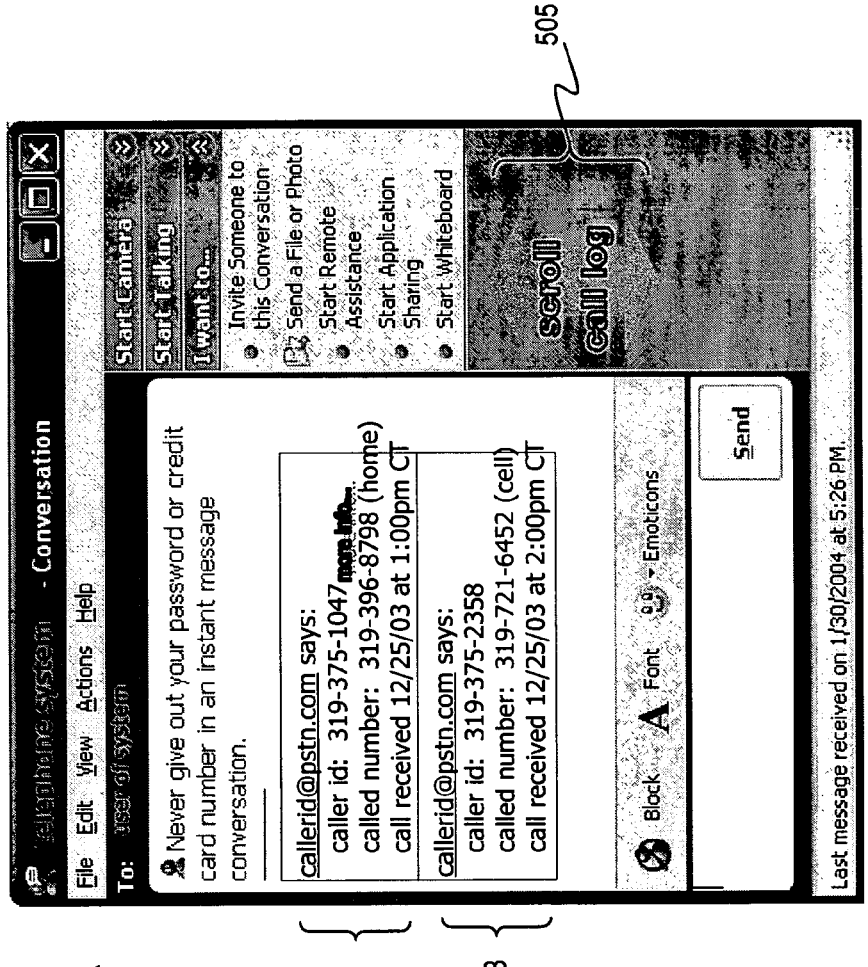
FIG. 5 is a diagram of an exemplary common instant communication client in support of the Caller ID service, according to an embodiment of the present invention.

FIG. 5 shows a diagram of an exemplary common instant communication client in support of the Caller ID service, according to an embodiment of the present invention. In this example, an IM/IC client supports a graphical screen 500 that shows two Caller ID entries 501, 503 corresponding to a home number and a cell number. As evident from the screen 500, a log is maintained of all Caller ID information pertaining to these two Caller Numbers (e.g., home and cell numbers), whereby the time of the calls are stored. The user has the option to scroll through the call log, per icon 505. The user can also access, scroll, or otherwise manipulate (including delete) the log records through alternate access methods such as web 315 or web services 317.

Thus, the platform 101 supports the capability to time/date stamp the Caller ID information. It is also noted that the platform 101 can be configured to provide the user with the ability to respond to the Caller ID information (and other telephony information) from an instant communication client with instructions back to the telephony network 103 as to subsequent handling of a call or to call back to the number if the call was missed. Additionally, the screen 500 can be designed to associate other useful information with the calling or called number and display to user (for example, identifying a number as cellular, home, or business, as well as inclusion of information related to the priority of the call). Further, this service supports a vehicle for providing real-time adjunct information associated with the calling number, such as yellow or white page directory listings, advertisements or other customized messages.

It is contemplated that the information found in the screen 500 can be displayed by any type of device with connectivity to the Caller ID Service Platform 101. By way of example, a gaming console with connectivity to a public data network (e.g., the Internet) can access the platform 101 because of the platform's web access capabilities, and consequently, can display the Caller ID information on a television. In situations whereby the user does not want to receive the call, the convenience of having Caller ID information displayed on the television spares the user from having to "run" to the phone while watching television. Similarly, the user, if on a computer, need not be disrupted by the call if the user deems the call unimportant or not of high priority, or is perhaps destined for another party who shares the same called number. For example, a parent or supervisor who is interested monitoring or at least being made aware of the activity of their kids or subordinates in real time and/or historical reference. In the context of the work environment for example, an employer can utilize this Caller ID service to monitor telephone calls/activity of an employee; further, given the convenience and the varied deployment scenarios of the IC client, the employer is afforded this monitoring capability from any location (e.g., remote office or home).

Moreover, the Caller ID Service Platform 101 provides a convenient mechanism for modifying the profile, as next described.

Figure 6:
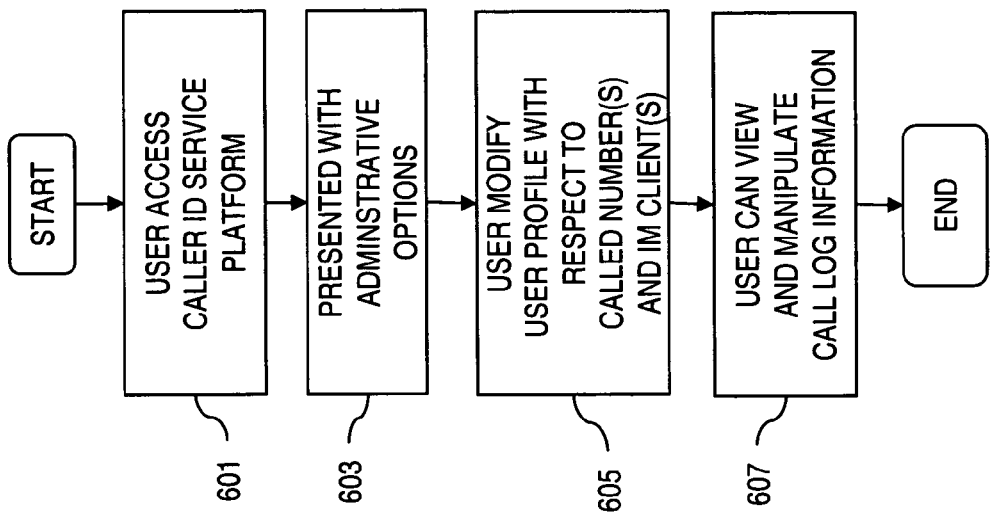
FIG. 6 is a flowchart of an administrative process for modifying a profile stored in the user database of FIG. 1.

FIG. 6 shows a flowchart of an administrative process for modifying a profile stored in the user database of FIG. 1. In this example, a user utilizes the host 105 to access the Caller ID Service Platform 101, per step 601. The login process can be based on conventional techniques of authentication and password systems. In step 603, the Caller ID Service Platform 101, upon verifying the user, can present a menu of options respecting various administrative functions, such as account and billing information, and profile creation and update. For example, the user can add more Called Numbers if the user wishes to be notified of calls being terminated at those numbers. Also, a Caller Number may change if the user changes residence, or occupation, for example. Further, the user may want to change a particular IM/IC client for receipt of the Caller ID formation. To effect any one of these changes, the user can modify the user profile, as in step 605. Additionally, the user can optionally view and/or modify the Call Log information (step 607).

It is noted that although the above example is described such that the user is both the "subscriber" to the Caller ID service and the person authorized to modify the profile, it is noted that a person other than the subscriber can be authorized to alter the profile stored in the User Database 125.

As evident from the above discussion, the platform 101 can supply convenience services to users (both consumer class users via a public IC system, as well as business class users via a private IC system). The Caller ID service can be used by telephone operators or call centers to reduce cost and complexity of determining caller ID (and related info) for incoming calls. Also, the Caller ID service can be deployed in higher end business or professional communications systems to reduce the cost and complexity and increase the user experience for personal assistance and call screening/management applications. Further, with delivery of Caller ID to IC network 127, this in effect provides a viable mechanism for widespread deployment of useful and cost effective devices.

Among the other advantages, the Caller ID service represents a significant revenue opportunity for service providers in that users are already accustomed this feature in the telephony arena.

Figure 7:
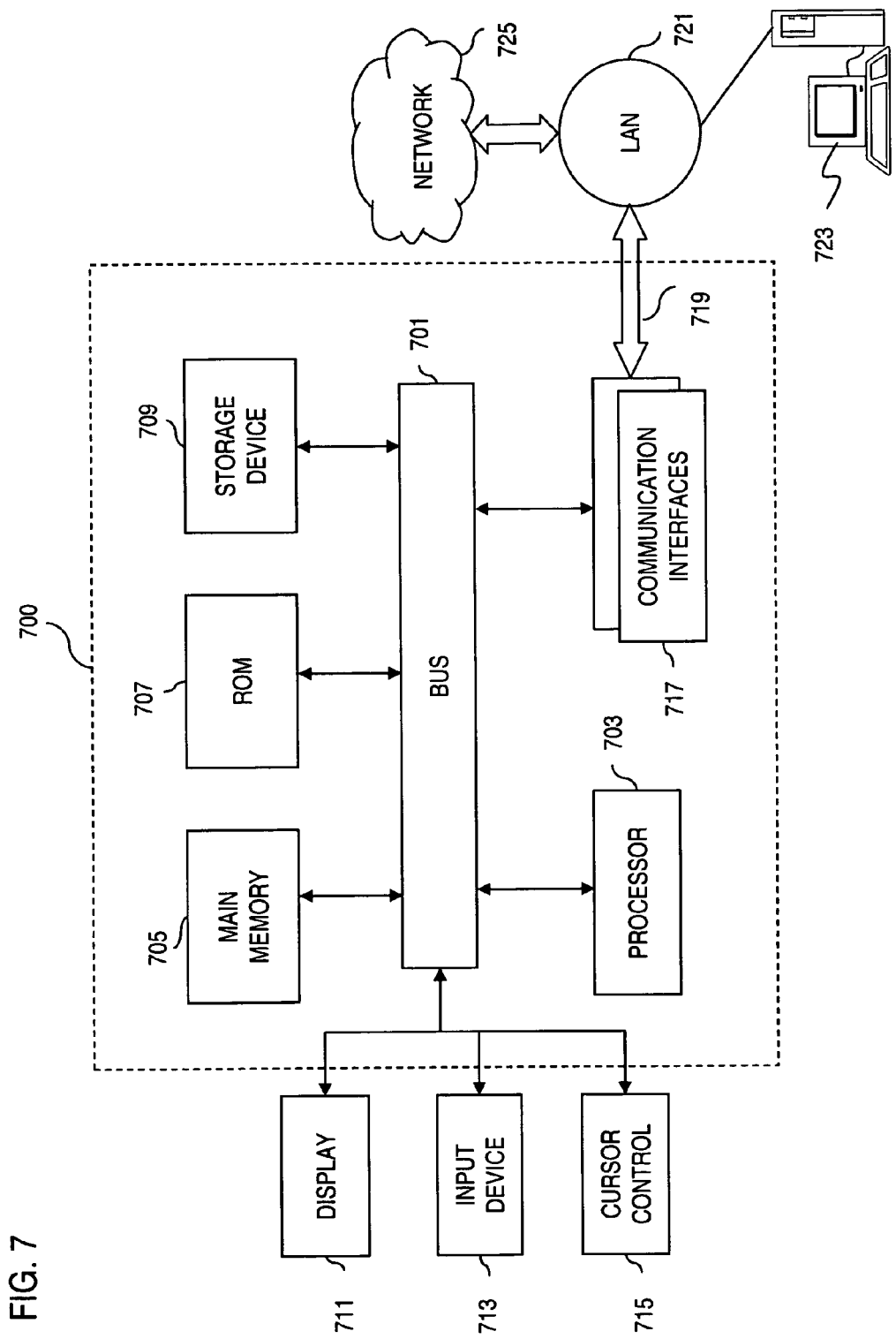
FIG. 7 is a diagram of a computer system that can be used to implement an embodiment of the present invention.

FIG. 7 illustrates a computer system 700 upon which an embodiment according to the present invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the screen 500 of FIG. 5 along with the process of FIG. 6 can be provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g., for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g., a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the present invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 705 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for supporting telephony services over a data network, the method comprising:
   determining that a voice session from a calling station is destined to called station associated with a user;
   obtaining an identifier associated with the calling station;
   determining an instant communication client of the user; and
   forwarding the identifier over the data network to the instant communication client, wherein the voice session is terminated at the called station and the instant communication client displays the identifier.

2. A method according to claim 1, wherein the called station is among a plurality of called stations associated with the user, the method further comprising:
   receiving another identifier associated with a different called station; and
   forwarding the other identifier to the instant communication client, wherein the instant communication client displays the identifiers concurrently.

3. A method according to claim 1, wherein the instant communication client is among a plurality of instant communication clients, the method further comprising:
   forwarding the identifier to one or more of the instant communication clients.

4. A method according to claim 1, further comprising:
   accessing a user database for a profile of the user, wherein the profile specifies the called station for monitoring and the instant communication client for displaying the identifier.

5. A method according to claim 4, further comprising:
   receiving a request to modify the profile of the user; and
   modifying the profile based on the request.

6. A method according to claim 1, wherein the instant communication client is resident on one of a computer system, a Personal Digital Assistant (PDA), a cellular phone, a gaming console, and a web appliance.

7. A method according to claim 1, wherein the voice session is one of a Plain Old Telephone Service (POTS) call and a Voice over Internet Protocol (VoIP) call.

8. A method according to claim 1, wherein the identifier is derived from an Automatic Number Identification (ANI) information.

9. A method according to claim 1, the method further comprising:
- receiving another identifier associated with a calling station; and
- forwarding the other identifier to the instant communication client, wherein the instant communication client displays the identifiers concurrently.

10. A method according to claim 9, wherein the other identifier is derived from a Dialed Number Identification Service (DNIS) number.

11. A method according to claim 1, the method further comprising:
- determining whether the instant communication client is available; and
- if the instant communication client is not available, storing the identifier for later delivery.

12. A method according to claim 1, the method further comprising:
- appending supplemental information to the identifier, wherein the supplemental information includes one of time stamp information and advertisement information.

13. A method according to claim 1, the method further comprising:
- associating a user with one or more called stations including the called station; and
- associating the user with one or more instant communication clients including the instant communication client.

* * * * *